United States Patent [19]

Sudhakar et al.

[11] Patent Number: 6,162,351
[45] Date of Patent: Dec. 19, 2000

[54] HYDRODENITROGENATION OF HYDROCARBONS UTILIZING A CARBON-SUPPORTED CATALYST

[75] Inventors: Chakka Sudhakar, Wappingers Falls; Frank Dolfinger, Jr., Poughkeepsie; Max Raphael Cesar, Newburgh, all of N.Y.

[73] Assignee: Texaco Inc., White Plains, N.Y.

[21] Appl. No.: 08/248,565

[22] Filed: May 24, 1994

Related U.S. Application Data

[63] Continuation-in-part of application No. 08/022,216, Feb. 25, 1993, abandoned.

[51] Int. Cl.[7] .................................................... C10G 45/04
[52] U.S. Cl. ............................. 208/216 PP; 208/216 R; 208/217; 208/254 H; 502/182; 502/185
[58] Field of Search .................... 208/216 R, 216 PP, 208/217, 254 H; 502/185, 182

[56] References Cited

U.S. PATENT DOCUMENTS

| | | | |
|---|---|---|---|
| 3,812,028 | 5/1974 | Wennerberg et al. | 502/180 |
| 3,997,473 | 12/1976 | Schmitt, Jr. et al. | 502/185 |
| 4,482,641 | 11/1984 | Wennerberg | 502/183 |
| 4,591,429 | 5/1986 | Ho et al. | 208/254 H |
| 4,626,339 | 12/1986 | Chianelli et al. | 208/254 H |
| 4,748,142 | 5/1988 | Chianelli et al. | 502/220 |
| 4,810,364 | 3/1989 | Shaw | 208/254 H |

*Primary Examiner*—Walter D. Griffin
*Attorney, Agent, or Firm*—Morris N. Reinisch; Dilworth & Barrese

[57] ABSTRACT

A naphtha or a middle distillate hydrocarbon is hydrodenitrogenized by hydrotreating in the presence of a catalyst containing a carbon support bearing (i) molybdenum or tungsten, (ii) a metal of non-noble Group VIII, and (iii) chromium.

5 Claims, No Drawings

HYDRODENITROGENATION OF HYDROCARBONS UTILIZING A CARBON-SUPPORTED CATALYST

This application is a continuation-in-part of application No. 08/022,216 filed Feb. 25, 1993, now abandoned.

RELATED APPLICATION

U. S. Ser. No. 07/990,381, filed Dec. 14, 1992 by Texaco Inc. as assignee of Chakka Sudhakar et al is directed to hydrodearomatization of naphthas or middle distillates by use of, as catalyst, a chromium-promoted carbon-supported heterogeneous catalyst, the text of which is incorporated herewith by reference.

FIELD OF THE INVENTION

This invention relates to a process for hydrodenitrogenating hydrocarbons. More particularly it relates to a process for treating a hydrocarbon oil to lower the content of undesirable nitrogen components.

BACKGROUND OF THE INVENTION

As is well known to those skilled in the art, nitrogen-containing components in middle distillate fuels represent a source of atmospheric pollution. The nitrogen content of those middle distillates may be as high as 0.6 w %. An illustrative light straight run gas oil may for example be typically found to contain 400–500 wppm nitrogen. As environmental considerations become of greater concern, it is desirable to treat hydrocarbons to decrease the content of undesirable nitrogen-containing components.

U.S. Pat. No. 3,997,473 (and its divisional U.S. Pat. No. 4,032,435) is directed to hydrodesulfurization of petroleum residues by use of a cobalt/nickel with molybdenum or tungsten on carbon catalyst which is characterized by an average pore radius of at least 25 Å and a BET Surface area of 200–800 m$^2$/g. The catalyst of these patents has a loading of VI-B metal "of at least 10 and up to about 20 weight percent expressed as metal oxide based on the weight of the catalyst support."

U.S. Pat. No. 4,082,652 is directed to treatment of heavy oils, such as gas oils, to effect hydrodesulfurization by use of a molybdenum/nickel on carbon catalyst. The catalyst preparation requires that the molybdenum be deposited first then sulfided, and only then that the nickel be added.

U.S. Pat. No. 3,546,103 is directed to the removal of metals and coke from hydrocarbon resids by use of, as pre-catalyst, metals of Group II-B or VI-B plus VIII on charcoal.

U.S. Pat. No. 3,367,862 is directed to desulfurization of heavy residual hydrocarbons by hydrolysis with water in the presence of catalyst on a char base.

U.S. Pat. No. 3,812,028 is directed specifically to "hydrotreating" fossil fuels containing polynuclear aromatics such as asphaltenes for converting the components boiling above 1000° F. to products boiling below 1000° F. (this is actually hydrocracking), by the use of Group VI and/or Group VIII metals on carbon, at a hydrogen partial pressure in excess of 2200 psig and at temperatures between 750° F. and 850° F.

U.S. Pat. No. 4,313,852 is directed to hydrotreating, particularly of coal liquids, in the presence of carbon supported molybdenum or tungsten sulfide catalysts with or without a second metallic component, in which catalysts the metal sulfides substantially completely exist on the outer surface of the active carbon support. The carbon supported catalyst preparation according to U.S. Pat. No. 4,313,852 must involve direct deposition of metal sulfides on the carbon support and subsequent reduction of them to lower valent sulfides.

U.S. Pat. No. 5,051,389 is directed to a method for preparing a catalyst composition for hydroconversion processes wherein the catalyst composition is formed by depositing one or more metal and/or metal compounds onto a preformed carbon support which has maximum dimension in any direction from about 50 Angstroms to about 5000 Angstroms, from the vapor phase at elevated temperatures. The catalysts made according to U.S. Pat. No. 5,051,389 have to be added to or combined with the carbonaceous material to be hydrotreated in only 50 ppm to 5000 ppm concentration for the hydroconversion process to take place (one-pass application).

U.S. Pat. No. 3,725,303 is directed to treating of aqueous solutions of oxy-sulfur compounds (such as sodium thiosulfate) by use of a catalyst containing molybdenum sulfide and cobalt sulfide on carbon support.

It is an object of this invention to provide a novel process and catalyst for hydrodenitrogenizing middle distillate hydrocarbon liquids. Other objects will be apparent to those skilled in the art.

STATEMENT OF THE INVENTION

In accordance with certain of its aspects, this invention is directed to a process for treating a charge hydrocarbon containing undesired nitrogen which comprises maintaining a bed of sulfided carbon-supported catalyst containing (i) molybdenum or tungsten, (ii) a metal of non-noble Group VIII, and (iii) chromium;

passing a charge hydrocarbon in the presence of hydrogen at hydrogen feed rate of 200–5000 SCFB, into contact with said sulfided catalyst containing (i) molybdenum or tungsten, (ii) a metal of non-noble Group VIII and (iii) chromium on a carbon support at hydrotreating conditions thereby effecting hydrodenitrogenation of said charge hydrocarbon containing undesired nitrogen and forming a product stream of hydrocarbon containing a lesser quantity of undesired nitrogen; and recovering said product stream of hydrocarbon containing a lesser quantity of undesired nitrogen.

DESCRIPTION OF THE INVENTION

The charge hydrocarbons which may be treated by the process of this invention may include light stocks such as naphthas or heavy stocks including e.g. vacuum gas oil. Typically naphthas may have an ibp of at least about 70° F. and typically 80° F.–200° F. The charge middle distillates may have an initial boiling point (ibp) by ASTM #D96 of at least about 300° F., and commonly about 300° F.–480° F.

These charge hydrocarbons may include light and full range naphtha (ibp of 70° F.–120° F.), heavy naphtha (ibp of 120° F.–200° F.), kerosene (ibp of 300° F.–340° F.), light gas oil (ibp of 360° F.–480° F.), heavy gas oil (ibp of 600° F.–700° F.), etc.

Many of these charge hydrocarbons may have a nitrogen content of 10–5000 wppm, typically 0.001%–0.2 w % and in addition an aromatics content as high as 80 v %, typically 20 v %–80 v %, say 25 v %–75 v %. They may contain other undesirables such as sulfur (0.1 w %–5 w %, typically 1 w %–4 w %).

A typical charge which may be treated by the process of this invention may be a light atmospheric gas oil (LAGO) having the following properties:

TABLE

| Property | Value |
|---|---|
| API Gravity | 32 |
| ibp ° F. | 386 |
| 10% bp ° F. | 506 |
| 50% bp ° F. | 571 |
| 90% bp ° F. | 651 |
| ep ° F. | 680 |
| S w% | 0.71 |
| N wppm | 490 |
| Aromatics w % * | 31 |

* by Supercritical Fluid Chromatography-ASTM # D-5186-91

In practice of the process of this invention, the charge may be admitted to a catalyst bed at about 400° F.–750° F., preferably 570° F.–720° F., say about 644° F. and 200–1800 psig, preferably 400–1500 psig, say 800 psig. Hydrogen is admitted at a flow rate of 200–5000 SCFB, preferably 500–4000 SCFB, say about 2000 SCFB. LHSV based on catalyst volume may be 0.5–10, preferably 1–5, say about 2.

The supported catalyst of this invention is prepared on an activated carbon support. Although it may be possible to utilize powdered carbon in a fluidized bed, it is preferred to utilize extrudates in a packed bed. The support may be in the form of granules, pellets, or extrudates of carbon plus a refractory inorganic support. The surface area (Brunauer-Emmett-Teller, BET) of the carbon support may range from 600 m²/g to 2000 m²/g. It is typically between 600 m²/g and 1800 m²/g. The preferred range is between 800 m²/g and 1400 m²/g, particularly in the range of 1000–1300 m²/g. The Total Pore Volume (TPV) for nitrogen is at least about 0.4 cc/g, preferably 0.4–1.2 cc/g, say 0.8 cc/g. The Pore Diameter (average), by nitrogen physisorption, is at least 16 Å, preferably 16 Å–50 Å, say 20 Å.

The Average Pore Diameter (Angstroms) is defined as:

$$= \frac{40,000 \times \text{Pore Volume for Nitrogen in cc/g.}}{\text{Nitrogen } BET \text{ Surface Area in } m^2/g.}$$

Illustrative commercially available carbon pellets, granules, or extrudates which may be used as catalyst supports used in fixed beds in practice of the process of this invention may include:

TABLE

A. The Norit RX carbon (of the Norit Company) acid-washed extrudate (3 mm diameter) having a surface area (BET) of 1424 m²/g, a TPV of 0.8 cc/g (for nitrogen), Average Pore Diameter of 22.4 Å, an apparent bulk density of 410 g/l, and ash content of about 4%.

B. The Norit R carbon (of the Norit Company) extrudate (3 mm diameter) having a surface area (BET) of 1217 m²/g, a TPV of 0.67 cc/g (for nitrogen), Average Pore Diameter 22 Å, and an apparent bulk density of 410 g/l.

C. The Calgon WS-IV carbon (of the Calgon Company) extrudate (3.2 mm diameter) having a surface area (BET) of 1675 m²/g, a TPV of 0.83 cc/g (for nitrogen), Average Pore Diameter 20 Å, apparent bulk density of 400 g/l, and ash content of less than 8%.

D. The Norit RX carbon (of the Norit Company) acid-washed extrudate (0.8 mm diameter) having a surface area (BET) of 1600 m²/g, a TPV of 0.82 cc/g (for nitrogen), Average Pore Diameter of 20 Å, an apparent bulk density of 410 g/l, and ash content of less than 4%.

It is a particular feature of the process of this invention that the desired hydrodenitrogenation of hydrocarbons is attained by use of a catalyst prepared from a carbon (whether as finely divided powder or as a granule) which is particularly characterized by a BET surface area between 600 m²/g and 2000 m²/g., by a Total Pore Volume of at least about 0.4 cc/g, and by an average Pore Diameter of 16 Å–50 Å which carbon has been loaded with (i) 1–40 w % of tungsten or molybdenum and, (ii) 0.1–15 w % of nickel or cobalt and (iii) 0.2–15 w % chromium based on total weight of catalyst.

The carbon supported catalysts of this invention are prepared using simple compounds of the elements such as nitrates, chlorides, sulfates and ammonium compounds of the elements, rather than complex molecules of the elements containing chelates, ligands, etc.; and, they are prepared by conventional techniques.

The catalytic metals may be deposited on the carbon, either sequentially or simultaneously, by various processes including incipient wetness impregnation, equilibrium adsorption, etc. from aqueous or non-aqueous media.

The tungsten or molybdenum may preferably be tungsten W,—present on the final catalyst in amount of 1–40 w %, preferably 10–40 w %, say 28 w % for W and 1–20 w %, preferably 5–18 w %, say 12 w % for Mo. Both tungsten and molybdenum may be employed.

The cobalt or nickel, preferably nickel, may be present on the final catalyst in amount of 0.1–15 w %, preferably 3–12 w %, say 6 w %. Both cobalt and nickel may be employed.

The chromium may be present in the final catalyst in amount of 0.2–10 w %, preferably 1–10%, say 3 w %.

The molybdenum or tungsten may be loaded onto the catalyst support preferably from aqueous solutions respectively of ammonium heptamolybdate or of ammonium metatungstate. The nickel or cobalt metal may be loaded onto the catalyst support from preferably aqueous solution of nickel nitrate hexahydrate or cobalt nitrate hexahydrate.

It is preferred to deposit the molybdenum or tungsten first and thereafter the cobalt or nickel metal with a drying step in between.

The chromium may be loaded onto the catalyst support preferably from an aqueous solution of chromium nitrate $0.9H_2O$. Chromium is preferably added after the other metals have been added or with the cobalt or nickel although it can be added to the catalyst support at any stage of catalyst preparation.

In a preferred embodiment, 100 parts of carbon support is contacted with an aqueous solution of a salt of molybdenum or tungsten e.g. ammonium heptamolybdate in amount to fill the pores to incipient wetness. The support bearing the metals may be dried at 20–150° C., say 115° C. for 2–24 hours, say 20 hours, optionally followed by calcination in air or inert atmosphere at 250–450° C., say 300° C. for 2–6 hours, say 3 hours.

Thereafter the support bearing molybdenum or tungsten is contacted with aqueous solution of the non-noble Group VIII metals e.g. nickel nitrate hexahydrate in amount to fill the pores to incipient wetness. The support bearing the metals is dried at 20–150° C., say 115° C. for 2–24 hours, say 20 hours, optionally followed by calcination at 250° C.–450° C., say 300° C. for 2–6 hours, say 3 hours.

The so-loaded support is then contacted with an aqueous solution of a chromium compound, typified by chromium nitrate 0.9H$_2$O, dried at 20–150° C., say 115° C. for 2–24 hours, say 20 hours, optionally followed by calcination at 250° C.–450° C., say 300° C. for 2–6 hours, say 3 hours.

The catalyst so prepared contains 1–40 w %, preferably 1–20 w %, typically 5–18 w %, say 12 w % of molybdenum or 10–40, preferably 28 w % of tungsten (measured as metal) and 0.1–15 w %, say 6 w % of non-noble Group VIII metal (measured as metal) and 0.1–15 w %, preferably 1–10, say 3 w % of chromium. The metals may exist in the final catalyst composition as metals, metal oxides, oxide-precursors, or as partially decomposed compounds.

The catalyst, bearing molybdenum and/or tungsten, chromium, and non-noble Group VIII metals, is sulfided, preferably after loading into the fixed bed reactor. Sulfiding may typically be effected by passing hydrogen sulfide, carbon disulfide, dimethyl sulfide, etc. through the bed (preferably in the presence of hydrogen) at 200° C.–450° C., say 350° C. (i.e. 392° F.–842° F., say 662° F.) and 0–1000 psig, say 0 psig for 2–24 hours, say 3 hours. Alternatively sulfiding may be carried out prior to loading the catalyst into the reactor. When the hydrocarbon to be treated by the process of this invention contains sulfur (typically in amount of about 1 w % or more) it may not be necessary to pre-sulfide the catalyst prior to use.

Practice of the process of this invention may be carried out by passing the charge hydrocarbon into contact with the catalyst at 400° F.–750° F., preferably 570° F.–720° F., say 644° F. and 200–1800 psig, preferably 400–1500 psig, say 800 psig at LHSV (based on catalyst) of 0.5–10, preferably 1–5, say 2, with hydrogen flow rates of 200–5000, preferably 500–4000, say 2000 SCFB.

During hydrodenitrogenation, it is found that the nitrogen content may be decreased from a charge content of 10–5000 ppm, say 490 ppm down to a product content of 5–2000 ppm, say 200 ppm. In the case for example of a light atmospheric gas oil (LAGO) containing 490 ppm nitrogen, this content may be reduced to less than 250 ppm in a typical operation. The values of HDN selectivity, defined as the ratio $k_{HDN}/k_{HDS}$, where $k_{HDN}$ is the first order rate constant for HDN and $k_{HDS}$ is the second order rate constant for Hydrodesulfurization (HDS), of the catalysts of the present invention are similar to the HDN selectivity values of conventional alumina supported hydrotreating catalysts under comparable reaction conditions.

It is a feature of the process of this invention that it permits removal of nitrogen from charge hydrocarbons. It is noted that this is effected with accompanying removal of only 6 w %–7 w % of the aromatic content. Conditions of operation to lower the nitrogen content to as little as 250 ppm are mild: typically for example 644° F. at 800 psig with hydrogen throughput of 2000 SCFB and space velocity LHSV of 2. Removal of a significant portion (say 60 w %–70 w %) of the aromatic content would require significantly more severe conditions—for example 716° F. at 1500 psig with hydrogen throughput of 4000 SCFB and space velocity LHSV of 1. It is also noted that the removal of nitrogen from charge hydrocarbons is accompanied by substantial removal of sulfur.

Practice of the process of this invention will be apparent to those skilled in the art from the following wherein all parts are parts by weight unless otherwise stated. An asterisk (*) indicates a control example.

In each of the Examples, the activated carbon used as the catalyst support is the RX brand of 0.8 mm diameter activated carbon of the Norit Company (D in Table supra) having a Brunauer-Emmett-Teller (BET) surface area of 1600 m$^2$/g, a nitrogen pore volume of 0.82 cc/g, and an average pore diameter of 20 Å measured from nitrogen physisorption data. In Example VIII*, the catalyst support is A of the Table supra which had been crushed and sieved to 20–40 mesh particle size.

EXAMPLE I

In this experimental Example, 24.5 parts of ammonium heptamolybdate 0.4H$_2$O is dissolved in 60 parts of fresh deionized water. Carbon support (80 parts) is impregnated with this solution to incipient wetness; and the impregnated material is left to stand at room temperature with occasional stirring for 2 hours. It is then heated slowly at a rate of 0.3° C./min to 115° C. in an oven in air, left at that temperature for 24 hours, and cooled slowly to room temperature over 3 hours.

One-third of the cooled material so obtained is impregnated to incipient wetness with a solution of 7.5 parts of chromium nitrate nonahydrate and 9.2 parts of cobalt nitrate 0.6H$_2$O in 11.3 parts of deionized water. The so impregnated material is left to stand at room temperature with occasional stirring for 2 hours. It is then heated slowly at a rate of 0.3° C./min to 115° C. in an oven in air, left at room temperature for 24 hours, and cooled slowly to room temperature over 3 hours.

The resulting catalyst contains 12 w % molybdenum, 5 w % cobalt, and 3 w % chromium on carbon support.

EXAMPLE II*

Ammonium heptamolybdate 0.4H$_2$O (12.0 parts) is dissolved in 29 parts of fresh deionized water. Carbon support (40 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The cooled material so obtained is impregnated to incipient wetness with a solution of 16.1 parts of cobalt nitrate hexahydrate in 22 parts of deionized water; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 12 w % molybdenum amd 6 w % cobalt on carbon support.

EXAMPLE III

In this experimental example, which discloses the best mode presently known of practicing the invention, ammonium heptamolybdate 0.4H$_2$O (24.5 parts) is dissolved in 60 parts of fresh deionized water. Carbon support (80 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

Nickel (II) nitrate hexahydrate (9.0 parts) and 7.5 parts of chromium (III) nitrate 0.9H$_2$O are dissolved in 13 parts of deionized water; and one third of the above material is impregnated to incipient wetness therewith. The impregnated material is left to stand at room temperature with occasional stirring for 2 hours. It is then heated slowly at a rate of 0.3° C./min to 115° C. in air in an oven, left at that temperature for 24 hours, and cooled slowly to room temperature at room temperature.

The resulting catalyst contains 12 w % molybdenum, 5.0 w % nickel, and 3 w % chromium on carbon support.

EXAMPLE IV*

In this Example, ammonium heptamolybdate $0.4H_2O$ (24.5 parts) is dissolved in fresh deionized water (60 parts); and carbon (80 parts) is impregnated with this solution to incipient wetness. The so-impregnated material is left at room temperature with occasional stirring for 2 hours. It is then heated slowly at a rate of 0.30° C./mm to 115° C. in an air oven, left at that temperature for 24 hours, and then cooled slowly to room temperature over 3 hours.

Two thirds of this material is impregnated to incipient wetness with a solution of nickel nitrate $0.6H_2O$ (18 parts) in deionized water (30.5 parts). The so-impregnated material is left at room temperature with occasional stirring for 2 hours. It is then heated slowly at a rate of 0.3° C./mm to 115° C. in an air oven, left at that temperature for 24 hours, and then cooled slowly to room temperature over 3 hours.

The resulting catalyst contains 12 w % molybdenum and 5 w % nickel—balance carbon.

EXAMPLE V*

Ammonium heptamolybdate $0.4H_2O$ (24.5 parts) is dissolved in 60 parts of fresh deionized water. Carbon support (80 parts) is impregnated with the solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The cooled material so obtained is impregnated to incipient wetness with a solution of 44.1 parts of nickel (II) nitrate hexahydrate in 30 parts of deionized water; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 12 w % molybdenum and 8.0 w % nickel.

EXAMPLE VI

In this experimental Example, ammonium metatungstate $(NH_4)_6H_2W_{12}O_{40}$ (112.5 parts) is dissolved in 120 parts of fresh deionized water. Carbon support (165 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

One fifth of the cooled material so obtained is impregnated with a solution of 17.8 parts of nickel (II) nitrate hexa-hydrate and 13.9 parts of chromium nitrate $0.9H_2O$ in 16 parts of deionized water to incipient wetness; and the impregnated material is left to stand at room temp-erature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 28 w % tungsten, 6 w % nickel and 3 w % chromium, the balance being carbon support.

EXAMPLE VII*

In this control Example, ammonium metatungstate (37.5 parts) is dissolved in 45 parts of fresh deionized water. Carbon support (58 parts) is impregnated with this solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

Half of the cooled material so obtained is impregnated with a solution of 12.4 parts of nickel (II) nitrate hexahydrate in 17 parts of deionized water to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 5 w % nickel and 28 w % tungsten, the balance being carbon support.

EXAMPLE VIII*

In this control Example, ammonium metatungstate $(NH_4)_6H_2W_{12}O_{40}$ (20.2 parts) is dissolved in 20.5 parts of fresh deionized water. Carbon support (27.5 parts) is impregnated with the solution to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The cooled material so obtained is impregnated with a solution of 23.7 parts of nickel (II) nitrate hexahydrate in 10 parts of deionized water to incipient wetness; and the impregnated material is left to stand at room temperature with occasional stirring for 2 hours. It is then heated slowly at a rate of 0.3° C./min to 115° C. in air in an oven, left at that temperature for 24 hours, and cooled slowly to room temperature over 3 hours.

The resulting catalyst contains 9.1 w % nickel and 28.8 w % tungsten, the balance being carbon support.

EXAMPLE IX*

In this control Example, chromium nitrate $0.9H_2O$ (16.5 parts) is dissolved in 24 parts of fresh deionized water. Carbon support (40 parts) is impregnated with the solution to incipient wetness; and the impregnated material is left to stand at room temperature with occasional stirring in a hood for 3 weeks to dry.

The resulting catalyst contains 5 w % chromium, the balance being carbon support.

EXAMPLE X*

In this control Example, nickel nitrate $0.6H_2O$ (8.6 parts) and chromium nitrate $0.9H_2O$ (13.8 parts) are dissolved in 10 parts of fresh deionized water. Carbon support (30 parts) is impregnated with this solution to incipient wetness; and the impregnated material is left to stand at room temperature with occasional stirring for 2 hours. It is then heated slowly at a rate of 0.30° C./min to 115° C. in air in an oven, left at that temperature for 24 hours, and cooled slowly to room temperature over 3 hours.

The resulting catalyst contains 5 w % nickel and 6 w % chromium, the balance being carbon support.

EXAMPLES XI–XX

Each of the catalysts of Example I–X is loaded into a hydrotreating reactor. Sulfiding is effected by passing hydrogen containing 10 v % of hydrogen sulfide through the catalyst bed at 25° C. and 1 atm for 15 minutes. The temperature of the reactor is increased by 3° C./minute to 350° C. and maintained at that sulfiding temperature for 2 hours. The temperature is then adjusted to reactor temperature (with the sulfiding gas still flowing). A back pressure of about 100 psig is applied to the reactor and the liquid feed is admitted at the desired rate. Once the liquid has passed beyond the catalyst bed, the flow of sulfiding gas is stopped, the flow of hydrogen is started at the desired rate, and the reactor pressure is increased to desired value. The actual hydrotreating run is considered to start at this point.

The liquid feed in all of the Examples is the light atmospheric gas oil (LAGO) having the properties tabulated supra.

The sulfur content of the feed and several product streams is determined by X-ray fluorescence (XRF) ASTM # D-2622. Nitrogen content is determined by Chemiluminescence Technique. The weight % Aromatics is determined by Supercritical Fluid Chromatography (SFC) ASTM # D-5186.

The particular reaction conditions (340° C. (644° F.)/800 psig, LHSV=2.0, and $H_2$ flow of 2000 SCFB) employed in the Examples are chosen in such a way that only partial hydrode-nitrogenation (HDN) occurs and thus permits one to compare the activities of different catalysts at identical reaction conditions. The results are presented on an equal volume basis.

TABLE

| Example | Catalyst of Example | Catalyst Comp | w % Mo/W | w % Ni/Co | w % Cr | % HDS | % HDN |
|---|---|---|---|---|---|---|---|
| XI | I | Co-Cr-Mo | 12.0 | 5.0 | 3.0 | 80.8 | 37.9 |
| XII* | II* | Co-Mo | 12.0 | 6.0 | 0 | 78.7 | 24.3 |
| XIII | III | Ni-Cr-Mo | 12.0 | 5.0 | 3.0 | 92.4 | 52.2 |
| XIV* | IV* | Ni-Mo | 12.0 | 5.0 | 0 | 92.8 | 46.2 |
| XV* | V* | Ni-Mo | 12.0 | 8.0 | 0 | 91.8 | 45.8 |
| XVI | VI | Ni-Cr-W | 28.0 | 6.0 | 3.0 | 88.6 | 47.7 |
| XVII* | VII* | Ni-W | 28.0 | 5.0 | 0 | 87.2 | 40.2 |
| XVIII* | VIII* | Ni-W | 28.0 | 9.1 | 0 | 86.7 | 40.7 |
| XIX* | IX* | Cr | 0 | 0 | 5.0 | 16.3 | 5.0 |
| XX* | X* | Ni-Cr | 0 | 5.0 | 6.0 | 31.8 | 12.5 |

TABLES

| Example | Catalyst of Example | % HDS | % HDN | $k_{HDN}/k_{HDS}$ |
|---|---|---|---|---|
| XI | I | 80.8 | 37.9 | 0.080 |
| XII* | II* | 78.7 | 24.3 | 0.054 |
| XIII | III | 92.4 | 52.2 | 0.042 |
| XIV* | IV* | 92.8 | 46.2 | 0.035 |
| XV* | V* | 91.8 | 45.8 | 0.039 |
| XVI | VI | 88.6 | 47.7 | 0.059 |
| XVII* | VII* | 87.2 | 40.2 | 0.053 |
| XVIII* | VIII* | 86.7 | 40.7 | 0.057 |

From the above Table, the following may be noted:

(i) The best mode of Example XIII permits attainment of 52.2% hydrodenitrogenation (HDN) of the charge light atmospheric gas oil—from a charge value of 490 wppm nitrogen to a product value of 234 wppm nitrogen (ii) The best mode of Example XIII also permits attainment of 92.4 w % hydrodesulfurization (HDS)—from a charge value of 0.71 w % to a product value of 0.054 w % sulfur.

(iii) It is to be noted that the conditions of the process of this invention (e.g. the lower temperature, pressure, and hydrogen flow rate and the higher space velocity) yield good HDN, with accompanying high HDS—but they do not permit attainment of high hydrodearomatization HDAr. Typically only up to 6–7% of the aromatics originally present are saturated under the instant conditions of operation the resulting product typically containing only slightly less aromatics than are found in the feed. At higher temperatures, pressures, and hydrogen flow rate and lower space velocities outside the scope of this invention, HDAr is undesirable effected typically in amount of 60–70 w %.

(iv) It is apparent that the chromium-doped Ni—Mo/carbon, Co—Mo/Carbon and Ni—W/Carbon catalysts of the present invention (Examples XI, XIII and XVI) are more active hydrodenitrogenation catalysts than are those which do not contain chromium (Examples XII, XIV–XV, and XVII–XVIII).

(v) The improvement in the hydrodenitrogenation activity is very significant for the Co—Cr—Mo/Carbon (e.g. Example XI) and is less for Ni—Cr—Mo/Carbon (e.g. Example XIII) or Ni—Cr—W (e.g. Example XVI).

(vi) Carbon supported chromium (no other metals present) catalyst (Example XIX*) has very low HDN activities for the same LAGO feed. This is probably because substantial sulfiding of chromium is not possible under the same conditions employed to effect almost complete sulfiding of molybdenum or tungsten. Carbon supported Ni—Cr catalyst (Example XX*) also possesses low HDN activity. However both these catalysts possess significant hydrodesulfurization (HDS) activity.

(vii) The hydrodesulfurization (HDS) activities of carbon supported catalysts which contain chromium, molybdenum/tungsten and cobalt/nickel (Examples XI, XIII, and XVI) are approximately the same as those corresponding catalysts which do not contain chromium (Examples XII*, XIV*, XV*, XVII*, and XVIII*).

From (iv), (vi) and (vii) above, it can be concluded that only when chromium is present on the carbon support along with molybdenum/tungsten or cobalt/nickel, the chromium promoted catalysts are more active for hydrodenitrogenation (HDN) compared to the corresponding catalysts that do not contain chromium.

It is thus possible to say from our observations that the chromium enhances the HDN activity of the carbon supported catalysts if it is present along with molybdenum and/or tungsten and non-noble Group VIII metals on the carbon support.

Although this invention has been illustrated by reference to specific embodiments, it will be apparent to those skilled in the art that various changes and modifications may be made which clearly fall within the scope of the invention.

What is claimed:

1. A process for treating a charge hydrocarbon characterized by an initial boiling point of from about 70° F. to 700° F., and containing undesired nitrogen and sulfur which comprises maintaining a bed of sulfided carbon-supported catalyst containing:

(i) at least one metal selected from 10–40 wt % tungsten or 5–18 wt % molybdenum; and (ii) 3–12 wt % of a non-noble Group VIII metal; and (iii) 1–10 wt % chromium, (iv) wherein the metals are loaded onto the carbon support from aqueous solutions of salts of the elements, and (v) wherein the carbon support has a B.E.T. surface area in the range of 600 m²/g to 2000 m²/g, a total pore volume for nitrogen of at least 0.4 cc/g, and an average pore diameter by nitrogen adsorption, defined as Average Pore Diameter (Angstroms):

$$= \frac{40{,}000 \times \text{Pore Volume for Nitrogen in cc/g.}}{\text{Nitrogen } BET \text{ Surface Area in } m^2/g.}$$

of between 16 and 50 Angstroms, passing said charge hydrocarbon in the presence of hydrogen, at a hydrogen feed rate of 200–5000 SCFB into contact with said sulfided catalyst defined above at hydrotreating conditions, including a temperature of 570° F.–720° F. and a pressure of 400–1500 psig, thereby effecting hydrodenitrogenation and hydrodesulfurization of said charge hydrocarbon containing undesired nitrogen and sulfur and forming a product stream of hydrocarbon containing a lesser quantity of undesired nitrogen and sulfur, and recovering said product stream of hydrocarbon containing a lesser quantity of undesired nitrogen and sulfur.

2. A process for treating a charge hydrocarbon containing undesired nitrogen components as claimed in claim 1 wherein said charge is a naphtha of initial boiling point of about 70° F.–200° F.

3. A process for treating a charge hydrocarbbon containing undesired nitrogen components as claimed in claim 1 wherein said charge is a middle distillate of initial boiling point of about 300° F.–480° F.

4. A process for treating a clay hydrocarbon containing undesired nitrogen as claimed in claim 1 wherein said charge is a gas oil.

5. The process of claim 1 wherein the charge hydrocarbon is light gas oil and the catalyst contains 12 wt % molybdenum, 5 wt % cobalt and 3 wt % chromium.

* * * * *